(12) United States Patent
Lee et al.

(10) Patent No.: US 8,359,615 B2
(45) Date of Patent: Jan. 22, 2013

(54) METHOD AND DIGITAL BROADCASTING SYSTEM FOR TRANSMITTING AND RECEIVING ESG

(75) Inventors: Byoung-Dai Lee, Seongnam-si (KR); Jae-Yeon Song, Seoul (KR); Young-Jip Kim, Suwon-si (KR); Jin-Woo Jeon, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 1157 days.

(21) Appl. No.: 12/234,967

(22) Filed: Sep. 22, 2008

(65) Prior Publication Data

US 2009/0083794 A1 Mar. 26, 2009

(30) Foreign Application Priority Data

Sep. 21, 2007 (KR) .............................. 2007-0096801

(51) Int. Cl.
*H04N 5/445* (2011.01)
(52) U.S. Cl. .............. 725/39; 725/15; 725/56; 370/392; 370/535
(58) Field of Classification Search ................... 725/31, 725/39, 56; 370/392, 535
See application file for complete search history.

(56) References Cited

U.S. PATENT DOCUMENTS

| 8,111,694 | B2* | 2/2012 | Pohjolainen et al. | 370/392 |
|---|---|---|---|---|
| 8,199,781 | B2* | 6/2012 | Seo et al. | 370/535 |
| 2003/0126610 | A1* | 7/2003 | Ando | 725/91 |
| 2006/0053450 | A1* | 3/2006 | Saarikivi et al. | 725/46 |
| 2007/0041377 | A1* | 2/2007 | Song et al. | 370/389 |
| 2008/0092163 | A1* | 4/2008 | Song et al. | 725/39 |

\* cited by examiner

*Primary Examiner* — Pankaj Kumar
*Assistant Examiner* — Sahar Baig
(74) *Attorney, Agent, or Firm* — The Farrell Law Firm, P.C.

(57) ABSTRACT

Disclosed is a method and a digital broadcasting system for transmitting and receiving an Electronic Service Guide (ESG). When there are ESG fragments to be transmitted through a communication network among ESG fragments included in ESG data, a digital broadcast transmitter generates an ESG data session such that the ESG data session may include route information through the communication network of the relevant ESG fragments. Then, the digital broadcast transmitter transmits the generated ESG data session to a broadcast receiving terminal, which obtains the route information through the communication network of the relevant ESG fragments. Accordingly, a user can more easily and conveniently receive the ESG data by using the route information through the communication network obtained by the broadcast receiving terminal.

18 Claims, 8 Drawing Sheets

METHOD AND DIGITAL BROADCASTING SYSTEM FOR TRANSMITTING AND RECEIVING ESG

PRIORITY

This application claims priority under 35 U.S.C. §119(a) to an application entitled "Method and Digital Broadcasting System for Transmitting and Receiving ESG" filed in the Korean Industrial Property Office on Sep. 21, 2007 and assigned Serial No. 2007-96801, the contents of which are incorporated herein by reference.

BACKGROUND OF THE INVENTION

1. Field of the Invention

The present invention relates generally to a digital broadcasting system, and more particularly to a method and a digital broadcasting system for transmitting and receiving an Electronic Service Guide (ESG).

2. Description of the Related Art

The term "digital broadcasting" generally refers to a broadcasting service which provides users with higher quality images, sound and other services than conventional analog broadcasting. The digital broadcasting includes, for example, Digital Multimedia Broadcasting (DMB), Digital Audio Broadcasting (DAB), Digital Video Broadcasting (DVB) and Digital Video Broadcasting-Handheld (DVB-H).

Particularly, the DVB system is a European digital broadcasting technology that refers to a transmission standard for supporting a mobile/portable digital multimedia service as well as the existing digital broadcasting.

The DVB system can multiplex Moving Picture Experts Group 2 Transport Stream (MPEG2 TS)-based broadcast data, and transmit an Internet Protocol (IP)-based data stream simultaneously with the multiplexed MPEG2 TS)-based broadcast data. Also, the DVB system can multiplex several services, and transmit the multiplexed services in one IP stream. In the DVB system as described above, a broadcast receiving terminal receives data transmitted in an IP stream and then demultiplexes the received data into separate services. Then, the broadcast receiving terminal demodulates the demultiplexed services, and outputs the demodulated services to a screen. Accordingly, a user can conveniently use a broadcasting service.

Meanwhile, when viewing a broadcast, the user needs information regarding, for example, the types of services that are provided by the DVB system and the contents that are included in each of the services. Accordingly, the conventional DVB system includes an ESG for providing information on each service. The ESG data includes such information as the time on a particular service, content related to the particular service, and information for receiving the related contents and for purchasing the related contents.

The DVB system transmits ESG data in either a single IP stream or in one or more IP streams when the capacity of the ESG data is large. Herein, using a single IP stream to transmit the ESG data is referred to as a "single stream mode," whereas using one or more IP streams to transmit the ESG data is referred to as a "multi-stream mode."

FIG. 1 illustrates a conventional process of transmitting ESG data in a multi-stream mode.

In FIG. 1, the broadcast receiving terminal checks an IP address of an ESG Bootstrap File Delivery over Unidirectional Transport Protocol (FLUTE) session from Program Specific Information/Service Information (PSI/SI) corresponding to a control signal channel in the DVB system.

The ESG Bootstrap FLUTE session is used to transmit information such as basic information of the ESG data on a provider of the ESG data, and a list of the ESG data provided by the relevant provider. The information as described above is transmitted from each of an ESG provider information (i.e. an ESG Provider Discovery Descriptor) field and an ESG access information (i.e. an ESG Access Descriptor) field. Particularly, an IP address of an ESG Announcement Carousel FLUTE session of each ESG data is transmitted from the ESG access information field.

Each piece of ESG data includes one ESG Announcement Carousel FLUTE session, which is used to provide brief information on the transmission and a configuration of the ESG data. Specifically, an ESG Init Message field in the ESG Announcement Carousel FLUTE session is used to transmit a compression method of an ESG container and parameters related to the compression method. Also, a Partition Declaration field in the ESG Announcement Carousel FLUTE session is used to transmit parameters that are respectively assigned partitioning criteria, such as a time and a service IDentifier (ID).

In addition, an Index List field, an Index Structure field, and a Multi Field Sub Index field are used to transmit structure information of the ESG data which is divided into several pieces of data, which are then transmitted. Namely, the fields are used to transmit information on which IP streams with a piece of ESG data are divided and are then transmitted, a container list of the multiple pieces of ESG data transmitted in the respective IP streams, and a list on ESG fragments included in each of the containers. Accordingly, by using the information as described above, the broadcast receiving terminal can recognize how the relevant ESG data is divided into multiple pieces of data which are then transmitted, without directly connecting to a session in which actual ESG data is transmitted.

The broadcast receiving terminal can receive an IP address, from which the actual ESG data is transmitted, from the Partition Declaration field, and can connect to a relevant ESG FLUTE session. At this time, the broadcast receiving terminal receives all ESG Fragment Containers in which the actual ESG data is included, and decodes all of the received ESG Fragment Containers, thereby completing one ESG data.

Meanwhile, in the single stream mode, the ESG Announcement Carousel FLUTE session does not exist differently from the case of the multi-stream mode as described above. Accordingly, in the single stream mode, an ESG Init Container is included in an ESG Single Stream FLUTE session in which the actual ESG data is transmitted, and the ESG Single Stream FLUTE session with the ESG Init Container is then transmitted. Also, in this case, the ESG Init Container does not include a Partition Declaration field differently from the case of the multi-stream mode.

The conventional ESG data is defined as a mechanism transmitted through a broadcasting network. Along with a general service, the ESG data can be provided through the broadcasting network and a communication network, but there is no defined signaling scheme for reporting if there is an update of all or part of the ESG data transmitted through the communication network. Accordingly, so that the broadcast receiving terminal may more conveniently receive the ESG data transmitted through the communication network in a point-to-point scheme, there is a need for a mechanism transmitting information that can be more conveniently received by the broadcast receiving terminal.

SUMMARY OF THE INVENTION

Accordingly, the present invention has been made to solve the above-stated problems occurring in the prior art, and the present invention provides a method and a digital broadcasting system for transmitting and receiving an ESG, in which a broadcast receiving terminal can effectively receive and manage ESG data transmitted through a broadcasting network or a communication network.

In accordance with the present invention, there is provided a method for transmitting and receiving an ESG by a digital broadcasting system, including determining whether there are ESG fragments to be transmitted through a communication network among ESG fragments included in ESG data by a digital broadcast transmitter, generating, by the digital broadcast transmitter, an ESG data session in such a manner that the ESG data session includes route information through the communication network of the ESG fragments when there are ESG fragments to be transmitted through the communication network, transmitting the generated ESG data session from the digital broadcast transmitter to a broadcast receiving terminal, receiving, by the broadcast receiving terminal, the ESG data session to determine whether the route information through the communication network is included in the received ESG data session, and obtaining, by the broadcast receiving terminal, the route information through the communication network when it is determined that the route information through the communication network is included in the received ESG data session.

In accordance with the present invention, there is provided a digital broadcasting system for transmitting and receiving an ESG, including a digital broadcast transmitter for generating an ESG data session in such a manner that the ESG data session includes route information through the communication network of the ESG fragments, and transmitting the generated ESG data session to a broadcast receiving terminal, when there are ESG fragments to be transmitted through a communication network among ESG fragments included in ESG data, the broadcast receiving terminal for receiving the ESG data session to determine whether the route information through the communication network is included in the received ESG data session, and obtaining the route information through the communication network when the route information through the communication network is included in the received ESG data session, and a broadcast server for transmitting the ESG fragments corresponding to a request signal for the ESG fragments to the broadcast receiving terminal when receiving the request signal from the broadcast receiving terminal.

BRIEF DESCRIPTION OF THE DRAWINGS

The above and other features, aspects, and advantages of the present invention will be more apparent from the following detailed description taken in conjunction with the accompanying drawings, in which.

DETAILED DESCRIPTION OF THE PREFERRED EMBODIMENTS

Figure 1:
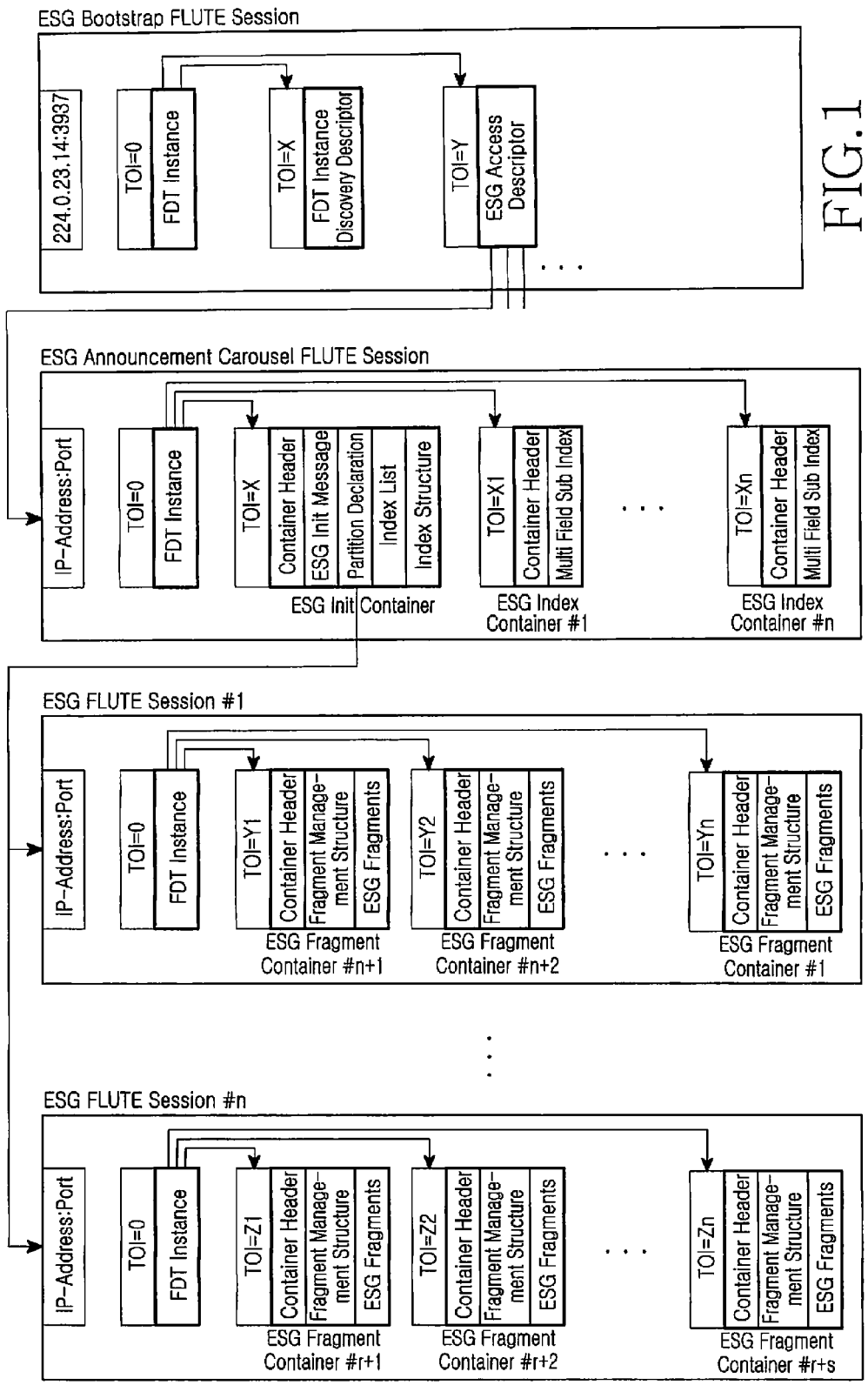
FIG. 1 illustrates a conventional process for transmitting ESG data in a multi-stream mode.

Hereinafter, preferred embodiments of the present invention will be described in detail with reference to the accompanying drawings. The same configuration elements in the accompanying drawings will be designated by the same reference numerals throughout the following description and drawings, although they are shown in different drawings. Particulars found in the following description of the present invention, such as specific configuration elements, are provided only to assist in the comprehensive understanding of the present invention. In the following description of the present invention, a detailed description of known functions and configurations incorporated herein will be omitted for the sake of clarity and conciseness.

The present invention discloses a method and a digital broadcasting system for transmitting and receiving an ESG To this end, when there are ESG fragments to be transmitted through a communication network among ESG fragments included in ESG data, a digital broadcast transmitter of the digital broadcasting system generates an ESG data session in such a manner that the ESG data session may include route information through the communication network of the relevant ESG fragments. Then, the digital broadcast transmitter transmits the ESG data session generated as described above to a broadcast receiving terminal. When receiving the ESG data session, the broadcast receiving terminal obtains the route information through the communication network of the relevant ESG fragments. Accordingly, a user can more easily and conveniently receive the ESG data transmitted through the communication network as well as a broadcasting network by using the route information through the communication network obtained by the broadcast receiving terminal.

Figure 2A:
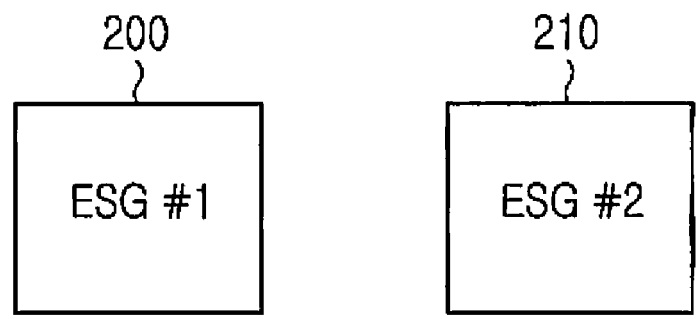
FIG. 2 illustrates a structure of ESG data transmitted through a communication network according to the present invention.

The ESG data can be transmitted to the broadcast receiving terminal in a first manner in which all of the ESG data is transmitted through the communication network, and in a second manner in which ESG fragments are included in the ESG data, some of them may be transmitted through the broadcasting network, and the remaining ESG fragments may be transmitted through the communication network Specifically, when there are two pieces of ESG data 200 and 210 as illustrated in FIG. 2A, the one piece of ESG data 200 may be transmitted through the broadcasting network, and another piece of ESG data 210 may be transmitted through the communication network. Other than this, in the ESG data illustrated in FIG. 2B, some 220 of ESG fragments may be transmitted through the broadcasting network, and the remaining ESG fragments 230 may be transmitted through the communication network.

In FIG. 2A, a digital broadcast transmitter can provide information on ESG data transmitted through the communication network in a simple method for assigning Uniform Resource Locator (URL) information to a Bootstrap session. However, in FIG. 2B, a digital broadcast transmitter should provide information on the ESG data transmitted through the communication network in a method different from that in FIG. 2A. Accordingly, in the present invention, a detailed description will be made of an instance when particular ESG fragments included in the ESG data are transmitted through the communication network as in FIG. 2B from among the two cases as described above.

Figure 3:
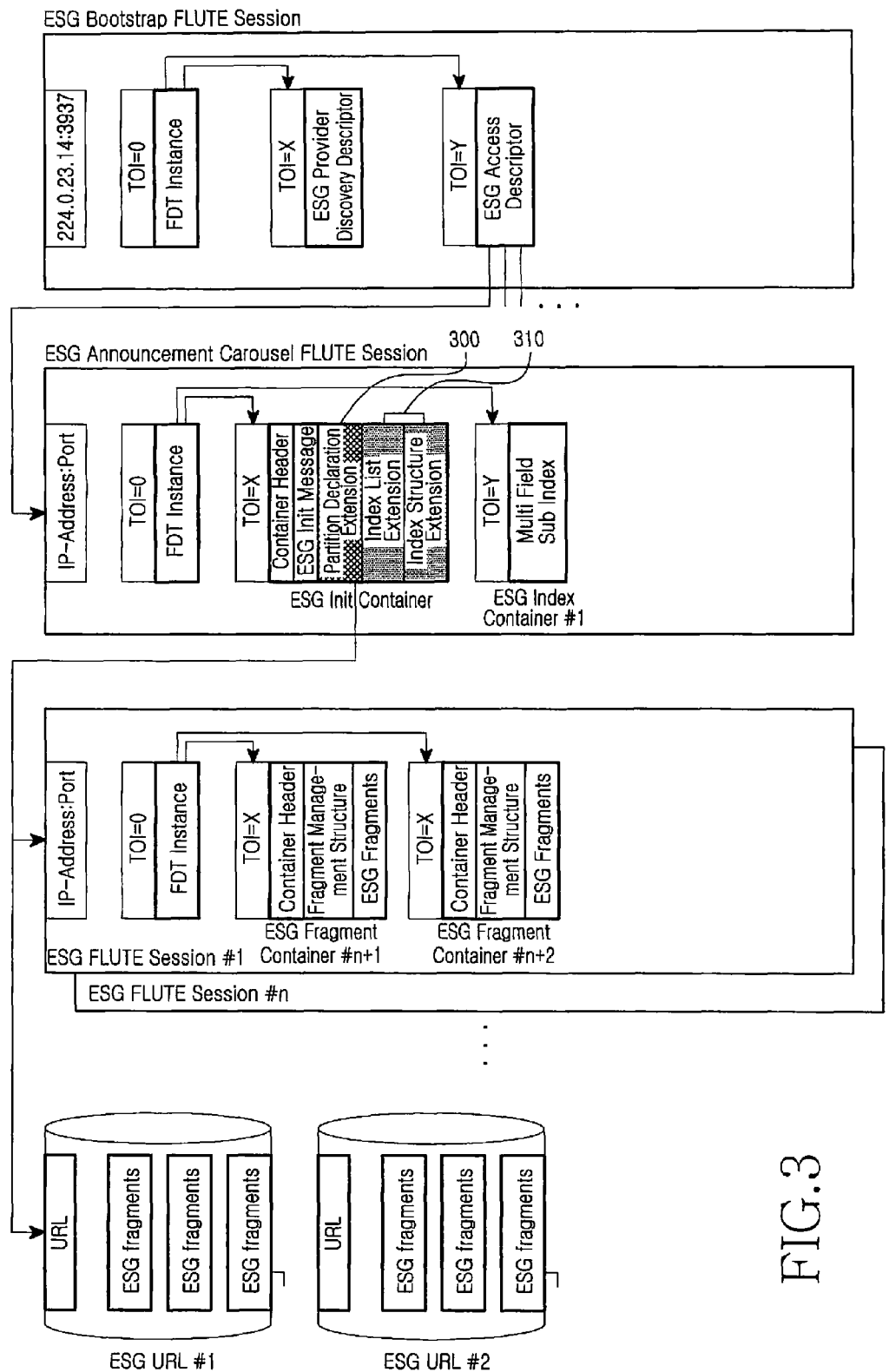
FIG. 3 illustrates a process for transmitting ESG data in a multi-stream mode.

FIG. 3 illustrates a configuration of a process for transmitting ESG data in a multi-stream mode according to the present invention. In FIG. 3, a structure of an ESG Announcement Carousel FLUTE session is extended in order to provide the information on the ESG data transmitted through the communication network. Namely, in order to provide information on ESG fragments to be transmitted through the communication network, route information through the communication network is included in a Partition Declaration field 300 and an Index List and Index Structure field 310 of an ESG Init Container in the ESG Announcement Carousel FLUTE session. According to the present invention, the route information through the communication network refers to URL information on the ESG fragments. Accordingly, in the follow description, the route information through the communication network is referred to as "URL information."

Meanwhile, in a single stream mode, the ESG Announcement Carousel session does not exist differently from in a multi-stream mode. Accordingly, in the single stream mode, the ESG Init Container is included in an ESG Single Stream FLUTE session, which is then transmitted. Also, in the single stream mode, the Partition Declaration field is not used in the ESG Init Container, and the URL information is thus included in an ESG Access Descriptor (or an ESG Access Descriptor field) of an ESG Bootstrap FLUTE session. Further, in a state where the Index List and Index Structure field disclosed in the present invention is included in the ESG Init Container, update information of the ESG data transmitted through the communication network is transmitted to the broadcast receiving terminal.

The broadcast receiving terminal acquires an IP address of the ESG Single Stream FLUTE session from the ESG Access Descriptor. Then, the broadcast receiving terminal connects to the ESG Single Stream FLUTE session through the acquired IP address, and receives the ESG Init Container. Accordingly, the broadcast receiving terminal checks the Index List and Index Structure field in the ESG Init Container, so that it can ascertain whether the ESG data transmitted through the communication network is updated. Meanwhile, according to the present invention, the update information of the ESG data transmitted through the communication network included in the Index List and Index Structure field may be transmitted through the communication network in response to a request of the broadcast receiving terminal.

The following description will be described based on the ESG multi-stream mode, but parts respectively corresponding to the Index List field and the Index Structure field disclosed in the present invention can be used in the single stream mode in the same manner as in the multi-stream mode.

When each of the multiple pieces of ESG data different from one another as in FIG. 2A is transmitted through the communication network, the digital broadcast transmitter assigns an access point to ESG fragments transmitted through the communication to the ESG Bootstrap FLUTE session. Then, the digital broadcast transmitter assigns URL information as ESG entry information to the ESG Bootstrap session. Accordingly, when the ESG data is transmitted from a broadcast server to the broadcast receiving terminal in a point-to-point scheme, URL information on the relevant broadcast server is included in the ESG Bootstrap FLUTE session. However, in FIG. 2B, in all of the ESG fragments included in the relevant ESG data, some are transmitted through the broadcasting network, and the remaining ESG fragments are transmitted through the communication network. Accordingly, the URL information is not included in the ESG Bootstrap FLUTE session, and the URL information is provided in a method different from that in FIG. 2A.

Figure 2B:
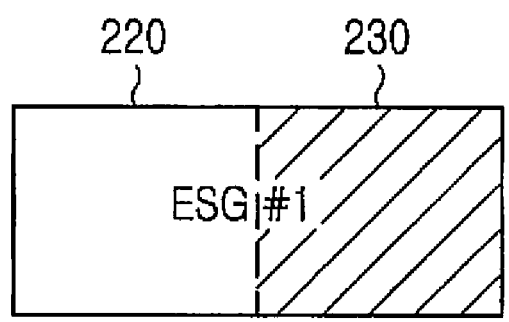

In FIG. 2B, the ESG Bootstrap session is first assigned entry information of the ESG fragments transmitted through the broadcasting network. Then, information on the ESG fragments transmitted through the communication network is included in the ESG Partition Declaration field and the Index List and Index Structure field of the ESG Announcement Carousel FLUTE session.

Accordingly, the broadcast receiving terminal recognizes in which session it can receive the ESG fragments transmitted through the broadcasting network in the ESG Bootstrap FLUTE session. Also, the broadcast receiving terminal recognizes URL information for receiving the ESG fragments transmitted through the communication network by using the information in the Partition Declaration field 300 and the Index List and Index Structure field 310 of the ESG Announcement Carousel FLUTE session.

Partitioning criteria on ESG data shown in Table 1 below are included in the Partition Declaration field 300 to which the present invention is applied.

TABLE 1

| Value | Encoding | Meaning |
|---|---|---|
| 0x00 | 0x0101 (unsigned short) | The number of hours for which the fragments are valid. This may be used to split the ESG into various schedule depths. |
| 0x01 | 0x0000 (string) | The URI of the Service fragments is a service ID. This may be used to carry all fragments relevant to a particular service. |
| 0x06 | 0x0204 (Boolean) | AccessType for ESG delivery. If the value is set to "1," it means that a part of the ESG is transmitted through a broadcasting network, else, set to "0," it means that a part of the ESG is transmitted through an interactive network. |

As noted in Table 1, in the Partition Declaration field 300 including the actual URL information, ESG transmission information is additionally included along with information enabling checking the partitioning criteria, including a time and a service ID. In the present invention, the ESG transmission information refers to a partitioning criterion as to whether the relevant ESG fragments are transmitted through the broadcasting network or the communication network. The ESG transmission information as described above is defined as a Boolean value. Specifically, a Boolean value of the ESG transmission information is set to "1" if the ESG fragments are transmitted through the broadcasting network, and is set to "0" if the ESG fragments are transmitted through the communication network. Also, a Start_field_value and an End_field_value included in the ESG Partition Declaration field are set to the same value since they do not need to have their own ranges differently from when the partitioning criteria includes a time and a service ID, for example.

Meanwhile, when the ESG transmission information is included in the Partition Declaration field 300 as described above, URL information corresponding to a transmission route of ESG fragments through the communication network is additionally inserted in the Partition Declaration field 300. The additional insertion of the URL information will be described in detail referring to Tables 2A to 2D below showing an ESG Partitioning Declaration syntax (hereinafter Partitioning syntax) according to the present invention.

URL information corresponding to a transmission route of ESG fragments transmitted through the communication network is included in a Partitioning syntax shown in each of Tables 2A to 2D below. Accordingly, through the Partition Declaration field 300, the broadcast receiving terminal can acquire both an IP address of each IP stream necessary to receive ESG fragments via the broadcasting network and URL information for receiving ESG fragments via the communication network.

According to the present invention, URL information is included in a Partitioning syntax in a scheme shown in each of Tables 2A to 2D below. Four different syntaxes shown in Tables 2A to 2D are subdivided according to whether a Partitioning syntax of each of the four different syntaxes is reverse compatible with an existing system. Specifically, if an ESG Entry Version field of the ESG Access Descriptor in the ESG Bootstrap FLUTE session is used, the ESG Access Descriptor can be defined as a new version regardless of the existing system. Also, as the ESG Access Descriptor is newly defined, an ESG Announcement Carousel session directed by the ESG Access Descriptor can be newly defined.

Meanwhile, the Partitioning syntax extended in the present invention can be implemented in a new scheme regardless of whether the extended Partitioning syntax is reverse compatible with the existing system differently from the above description. However, even though the ESG Access Descriptor is newly defined, when an ESG Announcement Carousel FLUTE session is defined in the same manner as the existing one, the Partitioning syntax must be implemented such that it may be reverse compatible with the existing system. Accordingly, the Partitioning syntax as described above is implemented such that only URL information is added to the original Partitioning syntax. With this, the present invention can be easily applied to the existing system.

A Partitioning syntax may be subdivided according to not only whether the Partitioning syntax is reverse compatible with the existing system, but also whether ESG Partitioning criteria in the broadcasting network are applied to ESG fragments transmitted through the communication network. The Partitioning syntax implemented according to the subdivision criteria as described above is divided into four ones according to the present invention.

As the first Partitioning syntax, Table 2A shows a Partitioning syntax for when the partitioning criteria in the broadcasting network are applied to the ESG fragments transmitted through the communication network without consideration of the backward compatibility with the existing system.

TABLE 2A

| Syntax | No. of bits | Mnemonic |
|---|---|---|
| ESG Session Partition Declaration{ | | |
| num_fields | 8 | uimsbf |
| Reserved | 8 | bslbf |
| for (k=0; k<num_fields; k++) { | | |
|     field_identifier[k] | 16 | bslbf |
|     field_encoding[k] | 16 | bslbf |
|     field_length[k] | 8 | uimsbf |
|     field_overlap[k] | 1 | bslbf |
|     reserved | 7 | bslbf |
| } | | |
| N_o_ESG_Access | 8 | |
| IPVersion6 | 1 | bslbf |
| Reserved | 7 | bslbf |
| for (i=0; I<n_o_ESG_Access; i++) { | | |
|     If (field_identifier == 0x06) { | | |
|         URL_length | | |
|         For (m=0; m<URL_length; m++) { | | |
|             URLByte; | | |
|         } | | |
|     } | | |
|     else { | | |
|         IPStreamID | 8 | uimsbf |
|         if (IPVersion6) { | | |
|             ESGSourceAddress[i] | 128 | bslbf |

TABLE 2A-continued

| Syntax | No. of bits | Mnemonic |
|---|---|---|
|             IPAddress[i] | 128 | bslbf |
|         } else { | | |
|             ESGSourceAddress[i] | 32 | bslbf |
|             IPAddress[i] | 32 | bslbf |
|         } | | |
|         Port[i] | 16 | uimsbf |
|         SessionID[i] | 16 | uimsbf |
|     } | | |
|     for (k=0; k<num_fields; k++) { | | |
|         if (field_length[k] == 0) { | | |
|             length[i][k] | 8+ | vluimsbf8 |
|         } | | |
|         if (overlapping) { | | |
|             start_field_value[i][k] | | bslbf |
|         } | | |
|         end_field_value[i][k] | | bslbf |
|         nextByteBoundary ( ) | | |
|     } | | |
| } | | |

The definitions of mnemonics in Table 2A are as follows. bslbf indicates "Bit string, left bit first", uimsbf indicates "Unsigned integer, most significant bit first", and vluimsbf8 indicates "Variable length code unsigned integer, most significant bit first"

In the Partitioning syntax shown in Table 2A, three parameters are set, which are a number (i.e. n_o_URL) of URLs respectively corresponding to transmission routes of sets of ESG fragments through the communication network, a number (i.e. n_o_IPStream) of IP streams respectively corresponding to transmission routes of sets of ESG fragments through the broadcasting network, and a sum of numbers of IP streams (i.e. n_o_ESG_Access).

Also, a partitioning identifier (i.e. a field_identifier) is set in order to provide the ESG transmission information for identifying whether the relevant ESG data is transmitted through either the broadcasting network or the communication network. All of the ESG fragments are checked by using each of values set as described above according to the present invention, to identify whether the ESG fragments are transmitted through either the broadcasting network or the communication network.

If the value of a partitioning identifier is equal to "1," the broadcast receiving terminal regards ESG fragments transmitted through the broadcasting network as existing. Otherwise, if the value of a partitioning identifier is equal to "0," the broadcast receiving terminal regards ESG fragments transmitted through the communication network as existing. Accordingly, when it is determined that the ESG fragments are transmitted through the communication network, the broadcast receiving terminal acquires URL information of a relevant broadcast server in order to receive the relevant ESG fragments. Otherwise, when it is determined that the ESG fragments are transmitted through the broadcasting network, the broadcast receiving terminal acquires an IP address of an ESG FLUTE session including the actual ESG fragments.

Meanwhile, since the ESG partitioning criteria in the broadcasting network are applied to the ESG fragments transmitted through the communication network in Table 2A, the broadcast receiving terminal can receive the ESG fragments according to the relevant partitioning criteria from the relevant broadcast server by using the URL information. For example, when a partitioning criterion is time, and a start_field_value and an end_field_value are respectively set to "1" and "6," the partitioning criterion of time is applied not only to ESG fragments transmitted through the broadcasting network, but also to ESG fragments transmitted through the communication network, so that the broadcast receiving terminal can receive ESG fragments designated from 1 to 6 o'clock.

Table 2B shows a second Partitioning syntax representing a case in which the reverse compatibility of the Partitioning syntax with the existing system is considered and the partitioning criteria in the broadcasting network are also applied to the ESG fragments transmitted through the communication network.

TABLE 2B

| Syntax | No. of bits | Mnemonic |
| --- | --- | --- |
| ESG Session Partitioning Declaration{ | | |
| num_fields | 8 | uimsbf |
| reserved | 8 | bslbf |
| for (k=0; k<num_fields; k++) { | | |
|   field_identifier[k] | 16 | bslbf |
|   field_encoding[k] | 16 | bslbf |
|   field_length[k] | 8 | uimsbf |
|   field_overlap[k] | 1 | bslbf |
|   reserved | 7 | bslbf |
| } | | |
| n_o_IPStreams | 8 | |
| IPVersion6 | 1 | bslbf |
| Reserved | 7 | bslbf |
| for (i=0; i<n_o_IPStreams; i++) { | | |
|   IPStreamID | 8 | uimsbf |
|   if (IPVersion6) { | | |
|     ESGSourceAddress[i] | 128 | bslbf |
|     IPAddress[i] | 128 | bslbf |
|   } else { | | |
|     ESGSourceAddress[i] | 32 | bslbf |
|     IPAddress[i] | 32 | bslbf |
|   } | | |
|   Port[i] | 16 | uimsbf |
|   SessionID[i] | 16 | uimsbf |
|   for (k=0; k<num_fields; k++) { | | |
|     if (field_length[k] == 0) { | | |
|       length[i][k] | 8+ | vluimsbf8 |
|     } | | |
|     if (overlapping) { | | |
|       start_field_value[i][k] | | bslbf |
|     } | | |
|     end_field_valuel[i][k] | | bslbf |
|     nextByteBoundary ( ) | | |
|   } | | |
| } | | |
| n_o_URL | | |
| For (n=0; n<n_o_URL; ++n) { | | |
|   URL | | |
|   for (k=0; k<num_fields; k++) { | | |
|     if (field_length[k] == 0) { | | |
|       length[n][k] | 8+ | vluimsbf8 |
|     } | | |
|     if (overlapping) { | | |
|       start_field_value[n][k] | | bslbf |
|     } | | |
|     end_field_value[n][k] | | bslbf |
|     nextByteBoundary ( ) | | |
|   } | | |
| } | | |

The definitions of mnemonics in Table 2B are as follows. bslbf indicates "Bit string, left bit first", uimsbf indicates "Unsigned integer, most significant bit first", and vluimsbf8 indicates "Variable length code unsigned integer, most significant bit first".

In Table 2B, the reverse compatibility of the Partitioning syntax with the existing system is considered, and therefore only URL information is additionally included in a last part of the second Partitioning syntax without a change of the existing Partitioning syntax. In this case, since the ESG partitioning criteria are also applied to the ESG fragments transmitted through the communication network, the ESG fragments transmitted through the communication network comply with the same partitioning criteria as those applied to ESG fragments transmitted through the broadcasting network. Accordingly, the broadcast receiving terminal can receive ESG fragments to which the partitioning criteria are applied in the same manner as in Table 2A.

Table 2C shows a Partitioning syntax representing a case where the reverse compatibility of the Partitioning syntax with the existing system is not considered and the ESG partitioning criteria in the broadcasting network are not applied to the ESG fragments transmitted through the communication.

TABLE 2C

| Syntax | No. of bits | Mnemonic |
| --- | --- | --- |
| ESG Session Partition Declaration{ | | |
| num_fields | 8 | uimsbf |
| reserved | 8 | bslbf |
| for (k=0; k<num_fields; k++) { | | |
|   field_identifier[k] | 16 | bslbf |
|   field_encoding[k] | 16 | bslbf |
|   field_length[k] | 8 | uimsbf |
|   field_overlap[k] | 1 | bslbf |
|   reserved | 7 | bslbf |
| } | | |
| n_o_ESG_Access | 8 | |
| IPVersion6 | 1 | bslbf |
| Reserved | 7 | bslbf |
| for (i=0; i<n_o_ESG_Access; i++) { | | |
|   If (field_identifier == 0x06) { | | |
|     URL_length | | |
|     For (m=0; m<URL_length; m++) { | | |
|       URLByte; | | |
|     } | | |
|   } | | |
|   else { | | |
|     IPStreamID | 8 | uimsbf |
|     if (IPVersion6) { | | |
|       ESGSourceAddress[i] | 128 | bslbf |
|       IPAddress[i] | 128 | bslbf |
|     } else { | | |
|       ESGSourceAddress[i] | 32 | bslbf |
|       IPAddress[i] | 32 | bslbf |
|     } | | |
|     Port[i] | 16 | uimsbf |
|     SessionID[i] | 16 | uimsbf |
|     for (k=0; k<num_fields; k++) { | | |
|       if (field_length[k] == 0) { | | |
|         length[i][k] | 8+ | vluimsbf8 |
|       } | | |
|       if (overlapping) { | | |
|         start_field_value[i][k] | | bslbf |
|       } | | |
|       end_field_value[i][k] | | bslbf |
|       nextByteBoundary ( ) | | |
|     } | | |
|   } | | |
| } | | |

The definitions of the mnemonics in Table 2C are as follows. bslbf indicates "Bit string, left bit first", uimsbf indicates "Unsigned integer, most significant bit first", and vluimsbf8 indicates "Variable length code unsigned integer, most significant bit first".

In Table 2C, the backward compatibility of the Partitioning syntax with the existing system is not considered, and therefore the existing Partitioning syntax changes due to the addition of URL information. Also, in Table 2C, three parameters are used as in Table 2A, bhose being a number of IP streams (i.e. n_o_IPStreams), a sum (i.e. n_o_ESGAccess) of numbers of URLs (a number of URLs is represented by an "n_o_URL"), and the value of a partitioning identifier (i.e. a field_identifier). However, since the partitioning criteria in the broadcasting network are not applied to the ESG fragments transmitted through the communication differently from Table 2A, the partitioning criteria are applied only to ESG fragments transmitted through the broadcasting network.

Table 2D below shows a Partitioning syntax representing a case where the reverse compatibility of the Partitioning syntax with the existing system is considered and the partitioning criteria in the broadcasting network are not applied to the ESG fragments transmitted through the communication.

TABLE 2D

| Syntax | No. of bits | Mnemonic |
|---|---|---|
| ESG Session Partition Declaration{ | | |
| num_fields | 8 | uimsbf |
| reserved | 8 | bslbf |
| for (k=0; k<num_fields; k++) { | | |
|     field_identifier[k] | 16 | bslbf |
|     field_encoding[k] | 16 | bslbf |
|     field_length[k] | 8 | uimsbf |
|     field_overlap[k] | 1 | bslbf |
|     reserved | 7 | bslbf |
| } | | |
| n_o_IPStreams | 8 | |
| IPVersion6 | 1 | bslbf |
| Reserved | 7 | bslbf |
| for (i=0; i<n_o_IPStreams; i++) { | | |
|     IPStreamID | 8 | uimsbf |
|     if (IPVersion6) { | | |
|         ESGSourceAddress[i] | 128 | bslbf |
|         IPAddress[i] | 128 | bslbf |
|     } else { | | |
|         ESGSourceAddress[i] | 32 | bslbf |
|         IPAddress[i] | 32 | bslbf |
|     } | | |
|     Port[i] | 16 | uimsbf |
|     SessionID[i] | 16 | uimsbf |
|     for (k=0; k<num_fields; k++) { | | |
|         if (field_length[k] == 0) { | | |
|             length[i][k] | 8+ | vluimsbf8 |
|         } | | |
|         if (overlapping) { | | |
|             start_field_value[i][k] | | bslbf |
|         } | | |
|         end_field_value[i][k] | | bslbf |
|         nextByteBoundary ( ) | | |
|     } | | |
| } | | |
| n_o_URL | | |
| For (n=0; n<n_o_URL; ++n) { | | |
|     URL | | |
| } | | |

The definitions of the mnemonics in Table 2D are as follows. bslbf indicates "Bit string, left bit first", uimsbf indicates "Unsigned integer, most significant bit first", and vluimsbf8 indicates "Variable length code unsigned integer, most significant bit first".

In Table 2D, the backward compatibility of the Partitioning syntax with the existing system is considered, and therefore URL information is additionally included in the existing Partitioning syntax, as in Table 2B. However, in Table 2D, the ESG partitioning criteria in the broadcasting network are not applied to the ESG fragments transmitted through the communication network differently from Table 2B.

According to the present invention as described above, the URL information is added to the Partition Declaration field 300, so that the broadcast receiving terminal can acquire the URL information corresponding to a transmission route of relevant ESG fragments. Also, in the present invention, the broadcast receiving terminal can combine ESG fragments transmitted through the communication network with ESG fragments transmitted through the broadcasting network by using the Index List and Index Structure field 310 as illustrated in FIG. 3.

The Index List and Index Structure field 310 includes a list of sets of ESG fragments to be transmitted through the broadcasting network (i.e. index information indicating an order of each set of ESG fragments and version information of each set of ESG fragments). Also, the Index List and Index Structure field 310 includes both index information indicating an order of each set of ESG fragments to be transmitted through the communication network, and version information for determining whether there is an update of ESG fragments to be transmitted through the communication network. Accordingly, the broadcast receiving terminal can easily and conveniently determine whether the relevant ESG fragments are updated without periodically connecting to a broadcast server based on the version information as described above.

Figure 4:
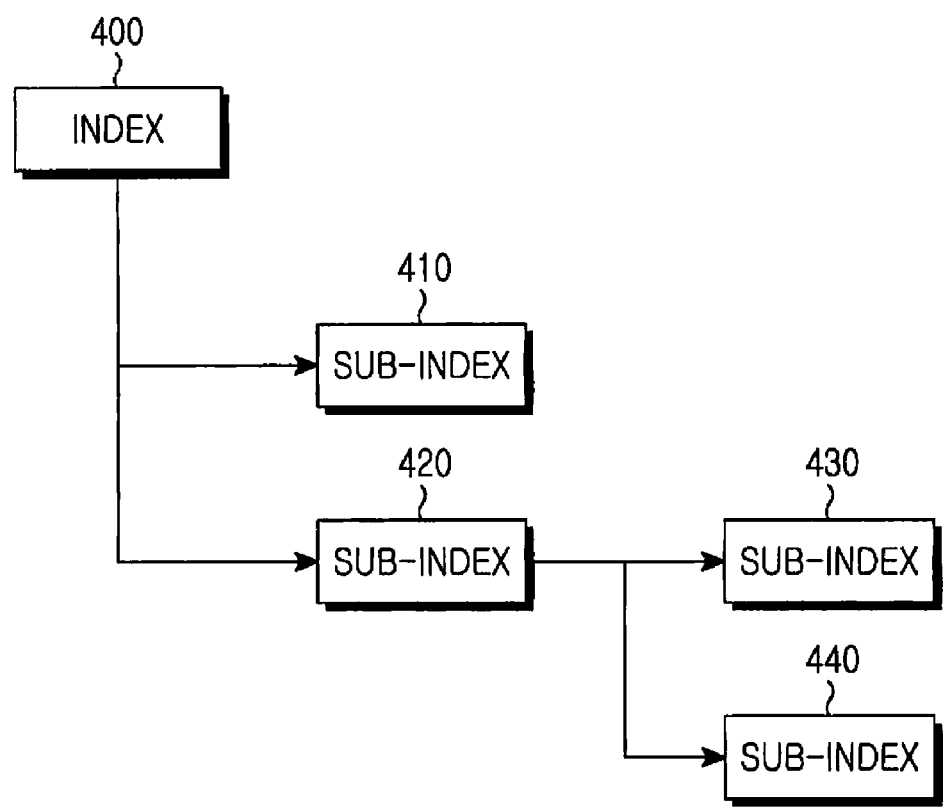
FIG. 4 illustrates an index according to the present invention.

The index information may be represented in a hierarchical structure shown in FIG. 4 according to the present invention. Referring to FIG. 4, index information 400 can have multiple pieces of subindex information 410 and 420 subordinate to it. Also, each of the multiple pieces of sub-index information 410 and 420 can have multiple pieces of sub-index information 430 and 440 subordinate to it. The index information as described above is classified according to whether the relevant ESG fragments are transmitted through either the communication network or the broadcasting network. At this time, the value of a partitioning identifier (i.e. a field_identifier) used as the classification criteria is shown in Table 3.

Table 3 shows that the value of an existing partitioning identifier is extended so that URL information on ESG fragments to be transmitted through the communication network may be added to the Partition Declaration field 300.

TABLE 3

| Value | Description |
|---|---|
| 0x0000 | Reserved |
| 0x0001 | IPFlowID as declared in the ESG FLUTE session Partition Declaration |
| 0x0002 | Fragment_id as declared in the fragment management information |
| 0x0003 | Fragment_version as declared in the fragment management information |
| 0x0004 | URL as declared in the ESG FLUTE session Partition Declaration |
| 0x0005-0xFFFF | Reserved |

By using a table configured as shown in Table 3, the broadcast receiving terminal can obtain the relevant URL information, and conveniently and easily identify ESG fragments to be transmitted through the communication network.

A digital broadcasting system disclosed in the present invention includes a digital broadcast transmitter, a broadcast receiving terminal, and a broadcast server.

In a multi-stream mode, the digital broadcast transmitter determines whether there are ESG fragments to be transmitted through a communication network among ESG fragments included in relevant ESG data. Then, the digital broadcast transmitter generates an ESG data session such that the ESG data session may include URL information corresponding to route information through the communication network of the ESG fragments when there are ESG fragments to be transmitted through the communication network. The ESG data session generated as described above is transmitted from the digital broadcast transmitter to the broadcast receiving terminal.

Upon receiving the ESG data session, the broadcast receiving terminal determines whether the URL information is included in the received ESG data session, and obtains the URL information when the URL information is included in the received ESG data session. At this time, the broadcast receiving terminal can connect to the broadcast server by using the URL information obtained in response to a request of a user. Accordingly, the broadcast server receives a request signal for the relevant ESG fragments, which it transmits to the broadcast receiving terminal corresponding to the request signal for the relevant ESG fragments. Accordingly, the user can more easily and conveniently acquire ESG fragments transmitted through the communication network without periodically connecting to the broadcast server.

Figure 5:
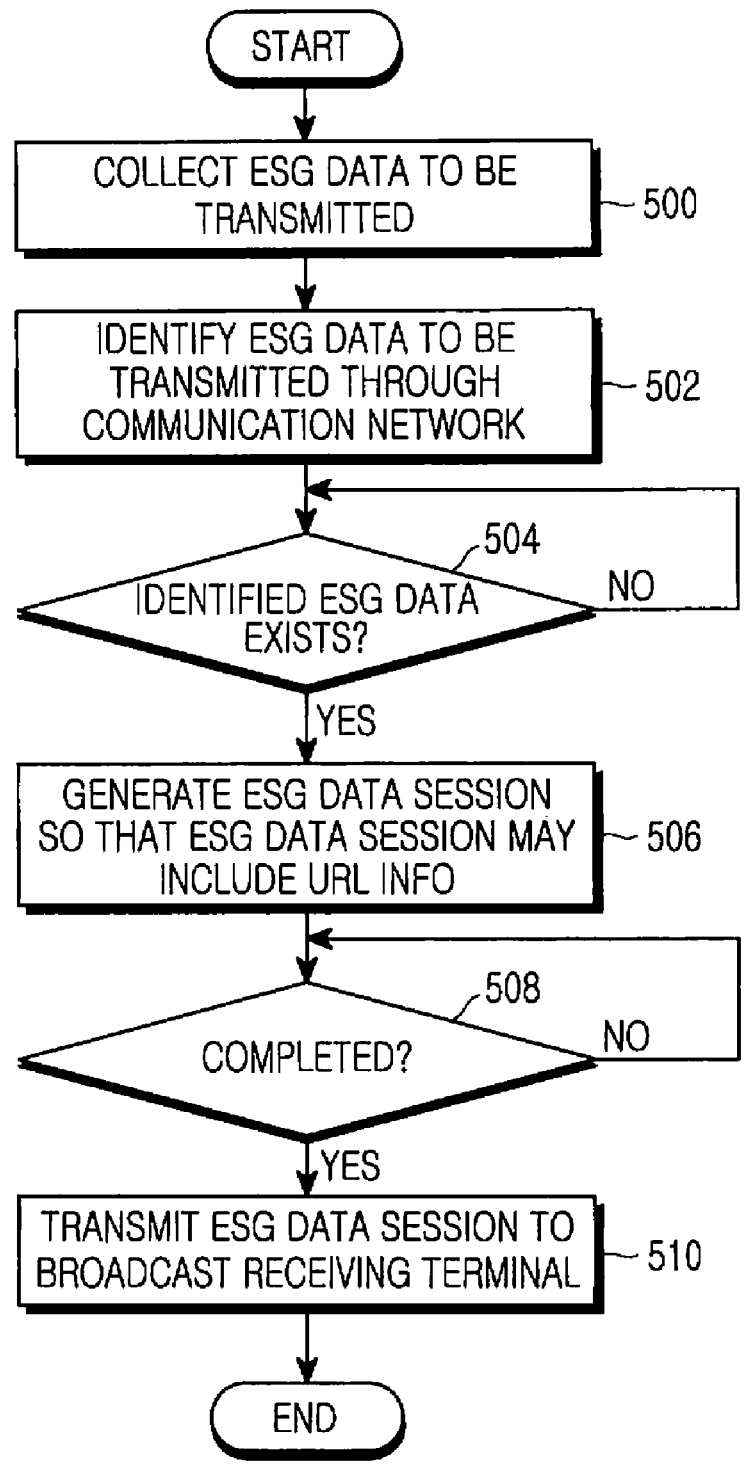
FIG. 5 illustrates a control operation of a digital broadcast transmitter for transmitting ESG data according to the present invention.

FIG. 5 illustrates a control operation of a digital broadcast transmitter for transmitting ESG data according to the present invention.

Referring to FIG. 5, the digital broadcast transmitter collects ESG data to be transmitted (step 500). Then, the digital broadcast transmitter proceeds to step 502, and identifies ESG data to be transmitted through the communication network. At this time, the term "ESG data" refers to ESG fragments to be transmitted through the communication network among ESG fragments included in the relevant ESG data. Accordingly, when identifying the ESG data to be transmitted through the communication network in step 502, the digital broadcast transmitter determines whether there are ESG fragments to be transmitted through the communication network among ESG fragments included in the relevant ESG data.

In step 504, the digital broadcast transmitter determines whether the identified ESG data exists. When it is determined that the identified ESG data exists, the digital broadcast transmitter proceeds to step 506, and generates an ESG data session so that the ESG data session may include URL information. Herein, an ESG data session is differently generated depending on whether the mode is single stream mode or multi-stream. In the single stream mode, the URL information is included in an ESG Access Descriptor (or an ESG Access Descriptor field) of an ESG Bootstrap FLUTE session in an ESG data session. Also, in the single stream mode, an ESG Init Container of an ESG Single Stream FLUTE session includes an Index List field and an Index Structure field, wherein the Index List field includes index information indicating an order of each set of ESG fragments to be transmitted through the communication network, and the Index Structure field includes version information for determining whether there is an update of ESG fragments to be transmitted through the communication network.

Unlike in the single stream mode, the URL information in the multi-stream mode is included in a Partition Declaration field of an ESG Init Container of an ESG Announcement Carousel FLUTE session in an ESG data session. Also, the URL information is included in the Partition Declaration field according to any of the schemes described above in Tables 2A to 2D.

In the multi-stream mode, the ESG Init Container of the ESG Announcement Carousel FLUTE session includes the same Index List and Index Structure field as in the above-described single stream mode. Accordingly, the broadcast receiving terminal can conveniently obtain information on a transmission structure of the ESG data and whether the ESG data is updated.

Meanwhile, the digital broadcast transmitter determines in step 508 whether the generation of the ESG data session is completed. When it is determined that the generation of the ESG data session is completed, the digital broadcast transmitter transmits the ESG data session to the broadcast receiving terminal in step 510. At this time, the digital broadcast transmitter transmits the ESG data session corresponding to either the single stream mode or the multi-stream mode. Upon receiving the ESG data session, the broadcast receiving terminal determines whether the URL information is included in the received ESG data session. When it is determined that the URL information is included in the received ESG data session, the broadcast receiving terminal obtains the relevant URL information.

Figure 6:
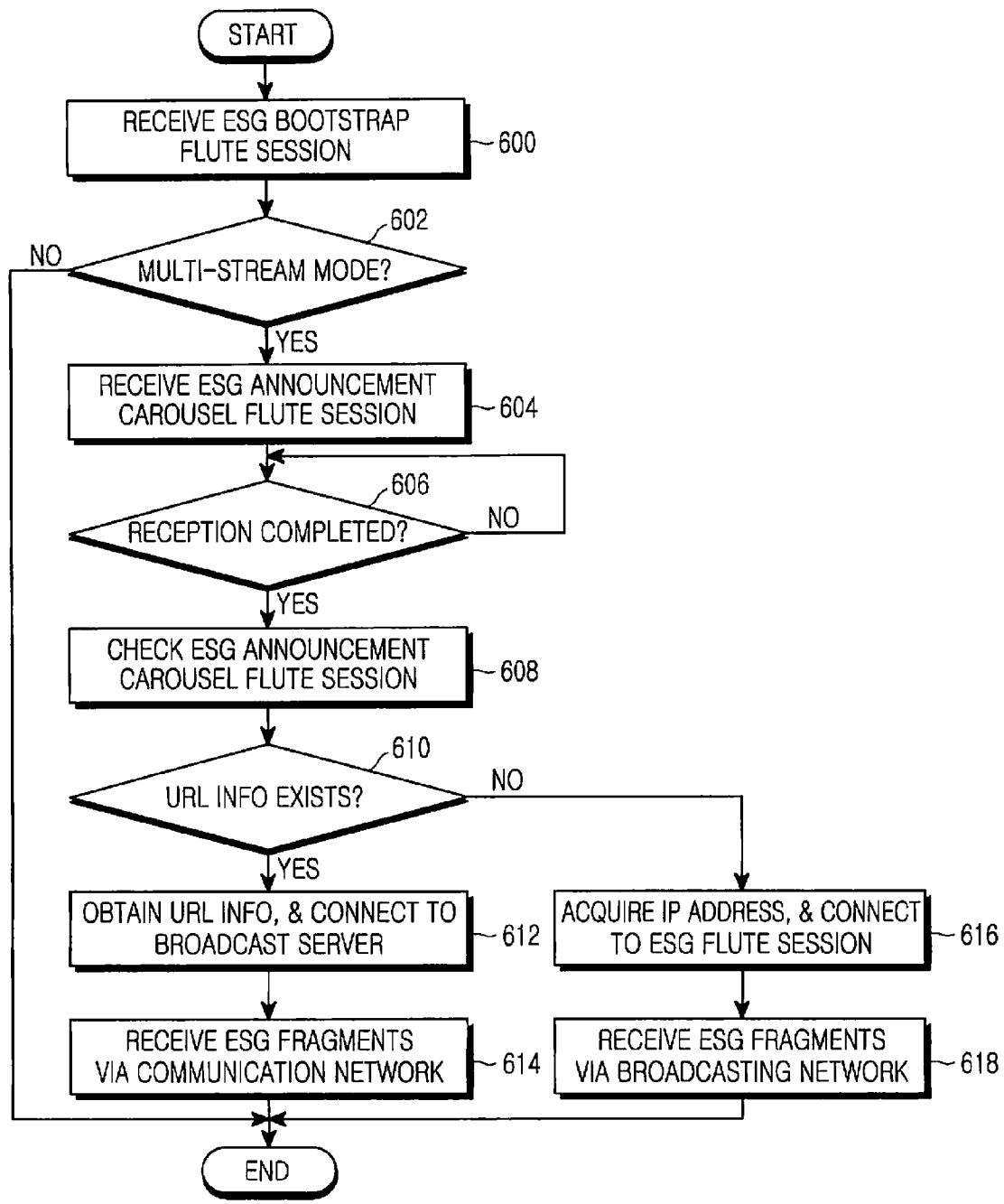
FIG. 6 illustrates a control operation of a digital broadcast receiver for receiving the ESG data according to the present invention.

FIG. 6 illustrates a control operation of a digital broadcast receiver for receiving the ESG data according to the present invention.

Referring to FIG. 6, the broadcast receiving terminal receives the ESG Bootstrap FLUTE session in step 600. In step 602, the broadcast receiving terminal determines whether the received ESG Bootstrap FLUTE session is in the multi-stream mode based on information provided by the received ESG Bootstrap FLUTE session. When it is determined that it is in the multi-stream mode, the broadcast receiving terminal proceeds to step 604, and receives the ESG Announcement Carousel FLUTE session. In the present invention, the ESG Bootstrap FLUTE session and the ESG Announcement Carousel FLUTE session are included in the ESG data session as described above. Accordingly, when the ESG data session is transmitted from the digital broadcast transmitter, the broadcast receiving terminal first receives the ESG Bootstrap FLUTE session, and determines whether the received ESG Bootstrap FLUTE session is in the multi-stream mode. When it is determined that the received ESG Bootstrap FLUTE session is in the multi-stream mode, the broadcast receiving terminal receives the ESG Announcement Carousel FLUTE session according to the access information provided by the ESG Bootstrap FLUTE session.

In step 606, the broadcast receiving terminal determines whether the reception of the ESG Announcement Carousel FLUTE session is completed. When the reception of the ESG Announcement Carousel FLUTE session is completed, in order to determine whether there are ESG fragments to be transmitted through the communication network, the broadcast receiving terminal proceeds to step 608, and checks the ESG Announcement Carousel FLUTE session. The URL information corresponding to the transmission route of the ESG fragments to be transmitted through the communication network is included in the ESG Init Container of the ESG Announcement Carousel FLUTE session. Accordingly, the broadcast receiving terminal checks the ESG Init Container, thereby determining whether the URL information is included in the ESG Init Container.

In step 610, the broadcast receiving terminal determines whether the URL information is included in the ESG Init Container. When it is determined that the URL information is included in the ESG Init Container, the broadcast receiving terminal obtains the URL information, and connects to the relevant broadcast server (step 612). At this time, the broadcast receiving terminal obtains, through the Index List field and the Index Structure field of the ESG Init Container, information indicating an order of each set of ESG fragments to be transmitted through the communication network and version information for determining whether there is an update of ESG fragments to be transmitted through the communication network, respectively. Accordingly, the broadcast receiving terminal connects to the broadcast server corresponding to the URL information obtained in response to a request of a user, and proceeds to step 614 to receive ESG fragments through the communication network. Then, the broadcast receiving terminal checks a transmission structure of the ESG fragments and an update of the ESG fragments based on the obtained index information and version information.

When obtaining the URL information, the broadcast receiving terminal provides the user with the relevant URL information. Then, the user connects to the relevant broadcast server by using the URL information provided by the broadcast receiving terminal, and transmits a request signal for the ESG fragments to the broadcast server. Upon receiving the request signal transmitted from the broadcast receiving terminal, the broadcast server transmits the relevant ESG data to the relevant broadcast receiving terminal through the communication network.

Meanwhile, when it is determined in step 610 that the URL information is not included in the ESG Init Container, the broadcast receiving terminal acquires an IP address corresponding to a transmission route of ESG fragments through the broadcasting network, and connects to an ESG FLUTE session (step 616). However, it is noted that the broadcast receiving terminal can acquire an IP address regardless of the existence or nonexistence of the URL information.

The broadcast receiving terminal acquires an IP address of an ESG FLUTE session including the actual ESG fragments through the ESG Announcement Carousel FLUTE session. Then, the broadcast receiving terminal connects to the ESG FLUTE session by using the acquired IP address, and receives ESG fragments through the broadcasting network in step 618.

According to the present invention, in the single stream mode, the broadcast receiving terminal acquires the URL information in a method different from that in the multi-stream mode.

When the broadcast receiving terminal receives the ESG Bootstrap FLUTE session and then determines that the received ESG Bootstrap FLUTE session is not in the multi-stream mode but in the single stream mode, it checks an ESG Access Descriptor in the ESG Bootstrap FLUTE session. When the URL information is included in the ESG Access Descriptor, the broadcast receiving terminal connects to the broadcast server corresponding to the URL information. At this time, the broadcast receiving terminal may immediately connect to the broadcast server corresponding to the URL information, or may connect to it in response to a request of the user. With this, the broadcast receiving terminal can receive the relevant ESG fragments from the broadcast server. Also, the broadcast receiving terminal can receive version information for determining whether there is an update of ESG fragments to be transmitted through the communication network along with index information of the relevant ESG fragments through the Index List field and the Index Structure field.

Meanwhile, when the URL information is not included in the ESG Access Descriptor, the broadcast receiving terminal acquires, from the ESG Access Descriptor, an IP address corresponding to a transmission route of ESG fragments through the broadcasting network. Then, by using the IP address acquired from the ESG Access Descriptor, the broadcast receiving terminal receives ESG fragments in an ESG Single Stream FLUTE session through the broadcasting network. Accordingly, the broadcast receiving terminal can efficiently and conveniently manage the ESG data transmitted through either the broadcasting network or the communication network in the process.

Figure 7:
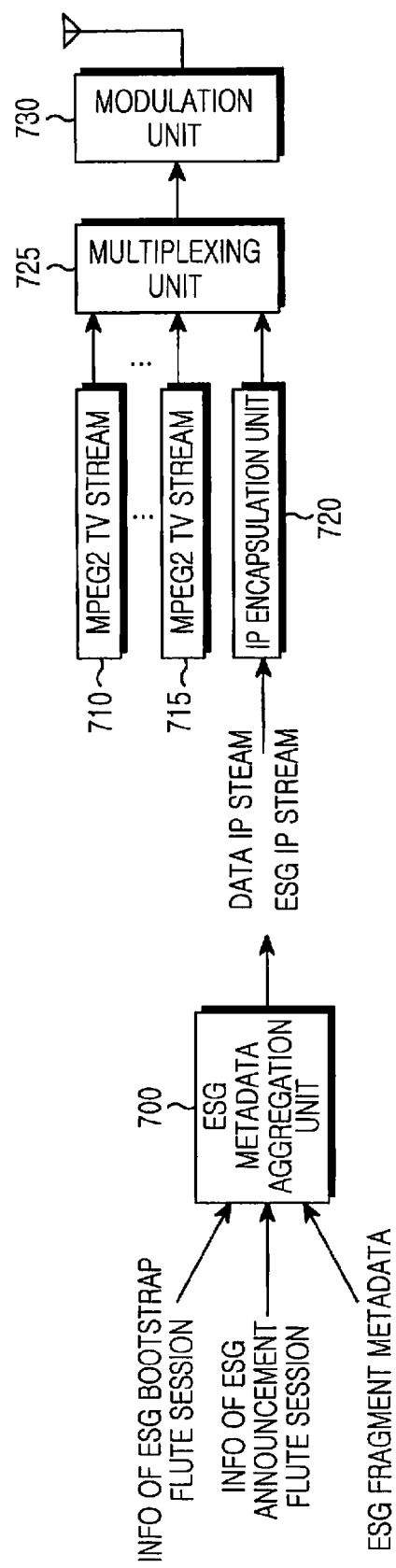
FIG. 7 illustrates a schematic configuration of the digital broadcast transmitter according to the present invention.

FIG. 7 illustrates a schematic configuration of the digital broadcast transmitter according to the present invention.

Referring to FIG. 7, the digital broadcast transmitter receives, as input, both multiple Moving Picture Experts Group 2 (MPEG2) TV streams 710 and 715 and a data IP stream including IP-based service data. Then, an ESG metadata aggregation unit 700 aggregates both the MPEG2 TV streams 710 and 715 and the ESG metadata representing service guide information on the data IP stream, and generates ESG data according to each embodiment as described above. At this time, the ESG metadata aggregation unit 700 encodes each ESG fragment of the relevant ESG data, and generates at least one ESG IP stream. Herein, the term "ESG metadata" refers to access information included in an ESG Bootstrap FLUTE session, information of an ESG Announcement Carousel FLUTE session including an IP address and URL information, and ESG fragments of an ESG FLUTE session in which actual ESG data is stored, for example.

The data IP stream and an ESG IP stream are encapsulated into an MPEP2 transmission stream by an IP encapsulation unit 720. The MPEP2 transmission stream is multiplexed along with the MPEG2 TV streams 710 and 715 by a multiplexing unit 725. The transmission streams multiplexed as described above are modulated into Orthogonal Frequency Division Multiplexing (OFDM) symbols by a modulation unit 730, and the OFDM symbols are then transmitted via an antenna.

Figure 8:
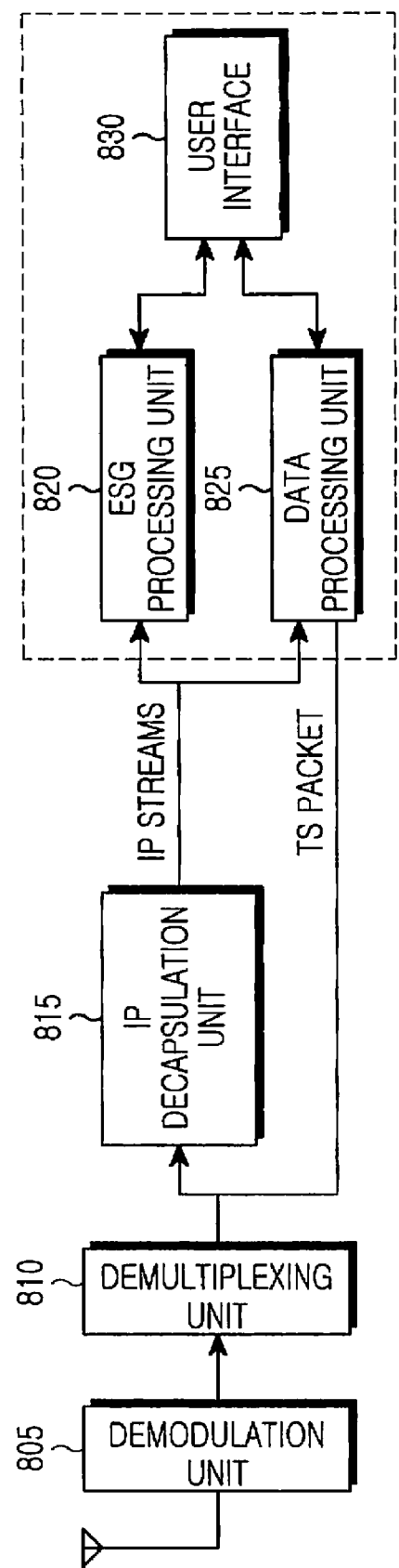
FIG. 8 illustrates a schematic configuration of the digital broadcast receiver according to the present invention.

FIG. 8 illustrates a schematic configuration of the digital broadcast receiver according to the present invention.

Referring to FIG. 8, in the broadcast receiving terminal, a signal is received via an antenna, and the received signal passes through an OFDM demodulation process by a demodulation unit 805. At this time, data demodulated by the demodulation unit 805 is divided into encapsulated streams and an MPEG2 Transport Stream (TS) packet by a demultiplexing unit 810. The MPEG2 TS packet passes through a series of processes, including MPEG demodulation necessary to display a relevant service to the user, by a data processing unit 825. Then, the encapsulated IP streams are demodulated again into IP streams by an IP decapsulation unit 815. At this time, the IP streams are again divided into a data stream and an ESG stream.

The data stream is input to the data processing unit 825 along with the MPEG2 TS packet, and the ESG stream is input to a ESG processing unit 820. The ESG processing unit 820 analyzes the ESG stream received as input. When ESG data is transmitted in the multi-stream mode, the ESG processing unit 820 receives and analyzes necessary parameters from the received ESG data, thereby demodulating the ESG data. When the received ESG stream is transmitted, the ESG processing unit 820 acquires both an IP address corresponding to a transmission route of ESG data transmitted through the broadcasting network and URL information corresponding to a transmission route of ESG data transmitted through the communication network.

Accordingly, by using the IP streams received as input, the ESG processing unit 820 and the data processing unit 825 provide information required by the user to a User Interface (UI) 830.

According to the present invention, the digital broadcasting system can effectively manage the ESG data through either the broadcasting network or the communication network. Also, the broadcast receiving terminal provides usefulness not only to an update of ESG data transmitted through the broadcasting network, but also to an update of ESG data transmitted through the communication network, which saves time and resources.

While the invention has been shown and described with reference to certain preferred embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims.

What is claimed is:

1. A method for transmitting and receiving an Electronic Service Guide (ESG) by a digital broadcasting system, the method comprising:

determining, by a digital broadcast transmitter, whether there are ESG fragments to be transmitted through a communication network among ESG fragments included in ESG data;

generating, by the digital broadcast transmitter, an ESG data session in such a manner that the ESG data session include route information through the communication network of the ESG fragments when there are the ESG fragments to be transmitted through the communication network;

transmitting the generated ESG data session from the digital broadcast transmitter to a broadcast receiving terminal;

receiving the ESG data session to determine whether the route information through the communication network is included in the received ESG data session, by the broadcast receiving terminal; and obtaining the route information through the communication network when it is determined that the route information through the communication network is included in the received ESG data session, by the broadcast receiving terminal.

2. The method as claimed in claim 1, wherein the route information through the communication network corresponds to Uniform Resource Locator (URL) information.

3. The method as claimed in claim 1, wherein the route information through the communication network is included in a Partition Declaration field of an ESG Init Container of an ESG Announcement Carousel File Delivery over unidirectional Transport Protocol (FLUTE) session in the ESG data session in a multi-stream mode.

4. The method as claimed in claim 3, wherein the ESG Init Container of the ESG Announcement Carousel FLUTE session includes an Index List field and an Index Structure field, the Index List field including index information indicating an order of each set of ESG fragments to be transmitted through the communication network, and the Index Structure field including version information for determining whether there is an update of the ESG fragments to be transmitted through the communication network.

5. The method as claimed in claim 1, wherein the route information through the communication network is included in an ESG Access Descriptor of an ESG Bootstrap FLUTE-session in the ESG data session in a single stream mode.

6. The method as claimed in claim 4, wherein the Index List field and the Index Structure field is included in an ESG Init Container of an ESG Single Stream FLUTEsession in a single stream mode.

7. The method as claimed in claim 1, wherein the obtaining the route information through the communication network further comprises:

receiving, by the broadcast receiving terminal, an ESG Bootstrap FLUTE session from the digital broadcast transmitter to determine whether the ESG Bootstrap FLUTE session is in either a single stream mode or a multi-stream mode;

receiving an ESG Announcement Carousel FLUTE session to determine whether the route information through the communication network is included in an ESG Init Container of the received ESG Announcement Carousel FLUTE session when the ESG Bootstrap FLUTE session is in the multi-stream mode;

connecting to a broadcast server corresponding to the route information through the communication network in response to a request of a user when it is determined that the route information through the communication network is included in the ESG Init Container of the received ESG Announcement Carousel FLUTE session; and receiving relevant ESG fragments from the broadcast server.

8. The method as claimed in claim 7, further comprising:

acquiring, by the broadcast receiving terminal, an Internet Protocol (IP) address corresponding to a transmission route of ESG fragments in a broadcasting network from the ESG Init Container of the received ESG Announcement Carousel FLUTE session, when the route information through the communication network is not included in the ESG Init Container; and receiving ESG fragments in an ESG FLUTE session via the broadcasting network by using the acquired IP address.

9. The method as claimed in claim 7, further comprising:

determining whether the route information through the communication network is included in an ESG Access Descriptor of the ESG Bootstrap FLUTE session when the ESG Bootstrap FLUTE session is in the single stream mode;

connecting to a broadcast server corresponding to the route information through the communication network in response to a request of a user when the route information through the communication network is included in the ESG Access Descriptor of the ESG Bootstrap FLUTE session; and receiving relevant ESG fragments from the broadcast server.

10. The method as claimed in claim 9, further comprising:

acquiring, by the broadcast receiving terminal, an IP address corresponding to a transmission route of ESG fragments in a broadcasting network from the ESG Access Descriptor of the ESG Bootstrap FLUTE session when the route information through the communication network is not included in the ESG Access Descriptor; and receiving ESG fragments in an ESG Single Stream FLUTE session through the broadcasting network by using the IP address acquired from the ESG Access Descriptor.

11. A digital broadcasting system for transmitting and receiving an Electronic Service Guide (ESG), the digital broadcasting system comprising:

a digital broadcast transmitter for generating an ESG data session such that the ESG data session includes route information through the communication network of the ESG fragments, and transmitting the generated ESG data session to a broadcast receiving terminal, when there are ESG fragments to be transmitted through a communication network among ESG fragments included in ESG data;

the broadcast receiving terminal for receiving the ESG data session to determine whether the route information through the communication network is included in the received ESG data session, and obtaining the route information through the communication network when the route information through the communication network is included in the received ESG data session; and a broadcast server for transmitting the ESG fragments corresponding to a request signal for the ESG fragments to the broadcast receiving terminal when receiving the request signal from the broadcast receiving terminal.

12. The digital broadcasting system as claimed in claim 11, wherein the route information through the communication network corresponds to Uniform Resource Locator (URL) information.

13. The digital broadcasting system as claimed in claim 11, wherein the route information through the communication network is included in a Partition Declaration field of an ESG Init Container of an ESG Announcement Carousel FLUTE-session in the ESG data session in a multi-stream mode.

14. The digital broadcasting system as claimed in claim 13, wherein the ESG Init Container of the ESG Announcement Carousel FLUTE session includes an Index List field and an Index Structure field, the Index List field including index information indicating an order of each set of ESG fragments to be transmitted through the communication network, and the Index Structure field including version information for determining whether there is an update of the ESG fragments to be transmitted through the communication network.

15. The digital broadcasting system as claimed in claim 11, wherein the route information through the communication network is included in an ESG Access Descriptor of an ESG Bootstrap FLUTE session in the ESG data session in a single stream mode.

16. The digital broadcasting system as claimed in claim 14, wherein the Index List field and the Index Structure field is included in an ESG Init Container of an ESG Single Stream FLUTE session in a single stream mode.

17. The digital broadcasting system as claimed in claim 11, wherein the broadcast receiving terminal acquires the relevant ESG fragments based on the route information through the communication network included in the ESG data session when there is a request of a user.

18. The digital broadcasting system as claimed in claim 11, wherein the broadcast receiving terminal acquires an Internet Protocol (IP) address corresponding to a transmission route of ESG fragments to be transmitted through a broadcasting network, and receives the ESG fragments transmitted through the broadcasting network based on the acquired IP address, when the route information through the communication network is not included in the received ESG data session.

* * * * *